US009286350B2

(12) United States Patent
Finnerty et al.

(10) Patent No.: US 9,286,350 B2
(45) Date of Patent: Mar. 15, 2016

(54) ESTIMATING MOST FREQUENT VALUES FOR A DATA SET

(71) Applicant: International Business Machines Corporation, Armonk, NY (US)

(72) Inventors: James L. Finnerty, Concord, MA (US); Venkatesh S. Gopal, Overland Park, KS (US); Venkannababu Tammisetti, Shrewsbury, MA (US); Paul-John A. To, Olathe, KS (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 13/930,642

(22) Filed: Jun. 28, 2013

(65) Prior Publication Data

US 2015/0006567 A1 Jan. 1, 2015

(51) Int. Cl.
*G06F 17/30* (2006.01)
(52) U.S. Cl.
CPC .................. *G06F 17/30463* (2013.01)
(58) Field of Classification Search
CPC ............ G06F 17/30463; G06F 17/30864; G06F 17/30867; G06F 17/30286; G06F 17/30595; G06Q 30/02
USPC .......................................................... 707/769
See application file for complete search history.

(56) References Cited

U.S. PATENT DOCUMENTS

| 6,801,903 | B2 | 10/2004 | Brown et al. | |
|---|---|---|---|---|
| 7,308,447 | B2 | 12/2007 | Chickering et al. | |
| 7,536,403 | B2 | 5/2009 | Gemulla et al. | |
| 8,392,381 | B2 | 3/2013 | Al-Kateb et al. | |
| 8,392,434 | B1 | 3/2013 | Woodruff et al. | |
| 2001/0014888 | A1* | 8/2001 | Tsuchida et al. | 707/2 |
| 2003/0088546 | A1* | 5/2003 | Brown et al. | 707/3 |
| 2004/0111410 | A1* | 6/2004 | Burgoon et al. | 707/4 |
| 2006/0212429 | A1* | 9/2006 | Bruno et al. | 707/3 |
| 2008/0071748 | A1* | 3/2008 | Wroblewski et al. | 707/3 |
| 2009/0018992 | A1* | 1/2009 | Zuzarte et al. | 707/2 |
| 2009/0106219 | A1* | 4/2009 | Belknap et al. | 707/4 |
| 2010/0030748 | A1* | 2/2010 | Netz et al. | 707/3 |
| 2010/0281033 | A1 | 11/2010 | Vojnovic et al. | |
| 2011/0161280 | A1* | 6/2011 | Luo | 707/604 |
| 2011/0302151 | A1* | 12/2011 | Abadi et al. | 707/714 |
| 2011/0313999 | A1* | 12/2011 | Bruno et al. | 707/718 |

(Continued)

OTHER PUBLICATIONS

Gibbons, P.B., and Y. Matias, "New Sampling-based Summary Statistics for Improving Approximate Query Answers", Proceedings of the 1998 ACM SIGMOD International Conference on Management of Data, © 1998 ACM, pp. 331-342, see sections 3 and 5. [Also Total 12 pp.].

(Continued)

*Primary Examiner* — Pierre Vital
*Assistant Examiner* — Andrew N Ho
(74) *Attorney, Agent, or Firm* — Janaki K. Davda; Konrad, Raynes, Davda & Victor LLP

(57) ABSTRACT

Provided are techniques for estimating most frequent values. A sample of values made up of rows is received from each of multiple nodes. The sample of values from each of the multiple nodes are aggregated to generate a sample table storing the rows. A descending list of most frequent values and associated frequencies is obtained using the sample table. Most frequent values are pruned from the descending list whose associated frequencies are below a minimum absolute frequency. The remaining most frequent values are extrapolated to reflect a data set.

15 Claims, 3 Drawing Sheets

(56) References Cited

U.S. PATENT DOCUMENTS

2013/0013631 A1* 1/2013 Rodinger .......... G06F 17/30598
 707/769
2013/0166556 A1* 6/2013 Baeumges ........ G06F 17/30598
 707/737

OTHER PUBLICATIONS

Vitter, J.S., "Random Sampling with a Reservoir", © 1985 ACM, ACM Transactions on Mathematical Software, vol. 11, No. 1, Mar. 1985, pp. 37-57. [Also total 21 pp.].

* cited by examiner

ESTIMATING MOST FREQUENT VALUES FOR A DATA SET

FIELD

Embodiments of the invention relate to estimating most frequent values for a data set. In particular, embodiments relate to estimating most frequent values for a data warehouse in an Asymmetrical Massively Parallel Processing Architecture (AMPP) environment with a small sample.

BACKGROUND

One type of database is a Relational DataBase Management System (RDBMS) that uses a Structured Query Language (SQL) interface. A database typically has many tables, and each table typically has multiple records and multiple columns. A table in a database may be accessed using an index, which is an ordered set of references (e.g., pointers) to the records in the table.

A query may be described as a request for information from a database based on specific conditions. A query typically includes one or more predicates. A predicate may be described as an element of a search condition that expresses or implies a comparison operation (e.g., A=3).

The database typically collects and uses statistics. With complete and relevant statistics in place, an optimizer of a database may generate a better query execution plan for executing the query. Most Frequent Values (MFVs) is one statistic that may be used by the database. MFVs identify which values occur in a table often and with an approximate estimation of their frequency. This information, along with dispersion information (e.g., number of unique values), and other statistics, help the database perform cost model estimations.

For example, assume that a table has one billion rows, and one column (col_1) has ten unique values, and one of the unique values occurs 99% of the time.

If most frequent value information were missing from the statistics, a predicate on col_1="value that occurs 99% of the time" would be assumed to have uniform distribution and, thus, the cost model is likely to underestimate the number of rows returned, which may impact the execution plan of the query with this predicate.

Similarly, a predicate on col_1"one of the values that occurs less than 1% of the time" may result in the cost model overestimating the number of rows returned, which may also impact the execution plan of the query with this predicate.

SUMMARY

Provided is a method for estimating most frequent values. A sample of values made up of rows is received from each of multiple nodes. The sample of values from each of the multiple nodes are aggregated to generate a sample table storing the rows. A descending list of most frequent values and associated frequencies is obtained using the sample table. Most frequent values are pruned from the descending list whose associated frequencies are below a minimum absolute frequency. The remaining most frequent values are extrapolated to reflect a data set.

Also provided is a computer program product for estimating most frequent values. The computer program product comprises a computer readable storage medium having program code embodied therewith, the program code is executable by at least one processor to perform: receiving from each of multiple nodes, a sample of values made up of rows; aggregating the sample of values from each of the multiple nodes to generate a sample table storing the rows; using the sample table to obtain a descending list of most frequent values and associated frequencies; pruning most frequent values from the descending list whose associated frequencies are below a minimum absolute frequency; and extrapolating remaining most frequent values to reflect a data set.

Moreover, provided is a computer system for estimating most frequent values. The computer system includes one or more processors, one or more computer-readable memories and one or more computer-readable, tangible storage devices, and program instructions, stored on at least one of the one or more storage devices for execution by at least one of the one or more processors via at least one of the one or more memories, to perform: receiving from each of multiple nodes, a sample of values made up of rows; aggregating the sample of values from each of the multiple nodes to generate a sample table storing the rows; using the sample table to obtain a descending list of most frequent values and associated frequencies; pruning most frequent values from the descending list whose associated frequencies are below a minimum absolute frequency; and extrapolating remaining most frequent values to reflect a data set

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
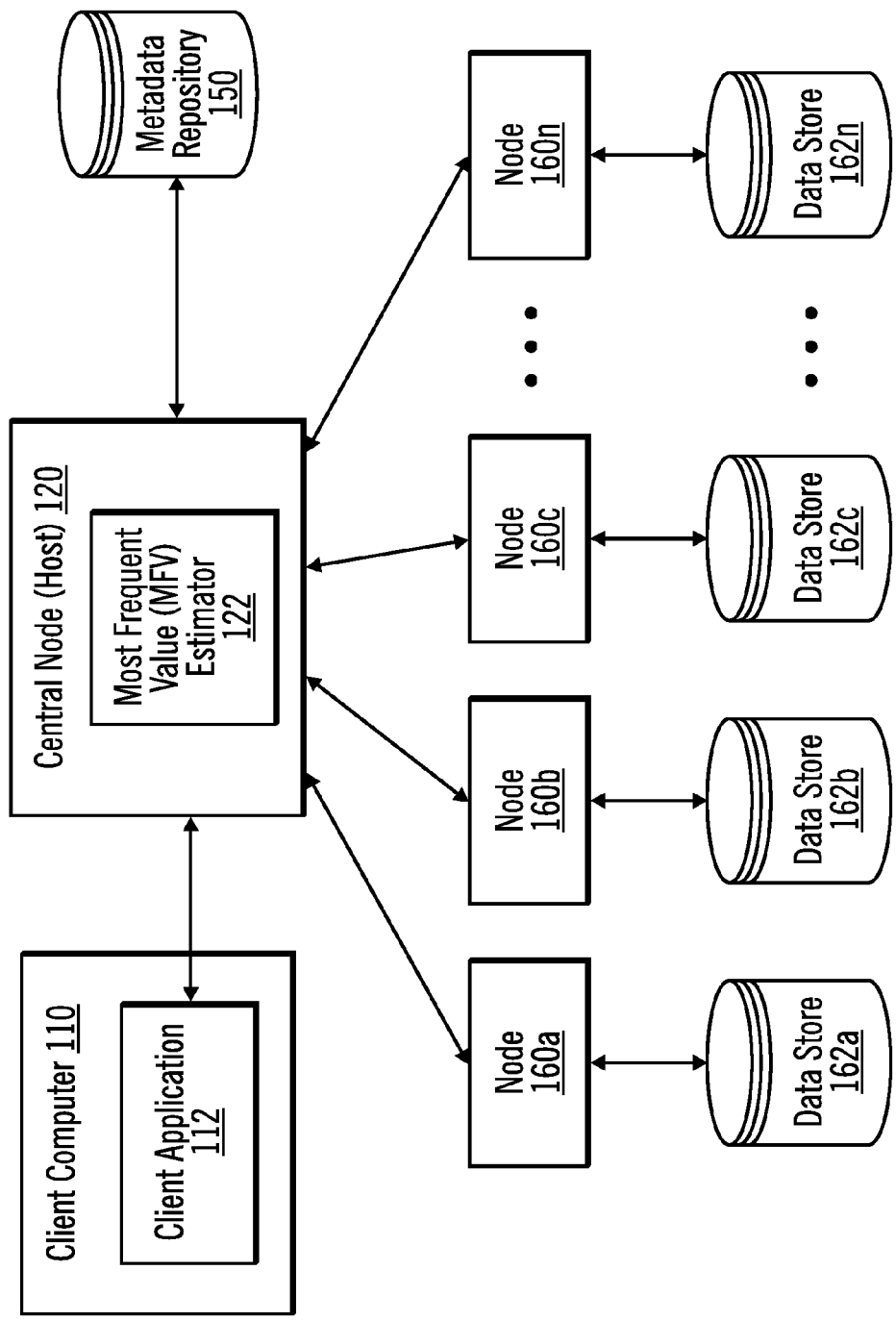
FIG. 1 illustrates, in a block diagram, a computing environment in accordance with certain embodiments.

FIG. 1 illustrates, in a block diagram, a computing environment in accordance with certain embodiments. A central node 120 includes a frequent value estimator 122. The central node 120 is coupled to a client computer 110, a metadata repository 150, and nodes 160a, 160b, 160c, . . . 160n. In various embodiments, any number of nodes may be coupled to the central node 120. Each of the nodes 160a, 160b, 160c, . . . 160n is coupled to a data store 162a, 162b, 162c, . . . 162n and stores a table of rows storing values. Each of the nodes 160a, 160b, 160c, . . . 160n includes at least a processor that is able to process values stored in the corresponding data store 162a, 162b, 162c, . . . 162n.

A client application 112 at the client computer 110 may issue a query to the central node 120. To process the query, the frequent value estimator 122 identifies frequent values using the metadata repository 150 and the nodes 160a, 160b,

160c, . . . 160n. The frequent values are gathered as part of a separate command. When this command is issued, the frequent value estimator 122 processes the command, and the results ("metadata") are stored in the metadata repository 150. The metadata repository 150 is in the central node 120. For subsequent query executions, the cost model may read this metadata and prepare a query execution plan.

In certain embodiments, each of the nodes 160a, 160b, 160c, . . . 160n stores a slice (e.g., subset) of data for a data set (e.g., an entire data set, a data warehouse, etc.). The data set has values (also referred to as data elements), and a slice of data has some number of these values. In certain embodiments, the slices may be different sizes on different nodes 160a, 160b, 160c, . . . 160n (e.g., have a different number of values). In certain alternative embodiments, the slices are the same size on the nodes 160a, 160b, 160c, . . . 160n (e.g., have a same number of values).

In certain embodiments, the computer environment of FIG. 1 is an Asymmetrical Massively Parallel Processing Architecture (AMPP) environment.

MFV statistics are useful in determining the cost model. MFV statistics may be used in selectivity estimates for a predicate, along with the dispersion information. The MFV estimator 122 estimates MFVs for any size table.

Figure 2:
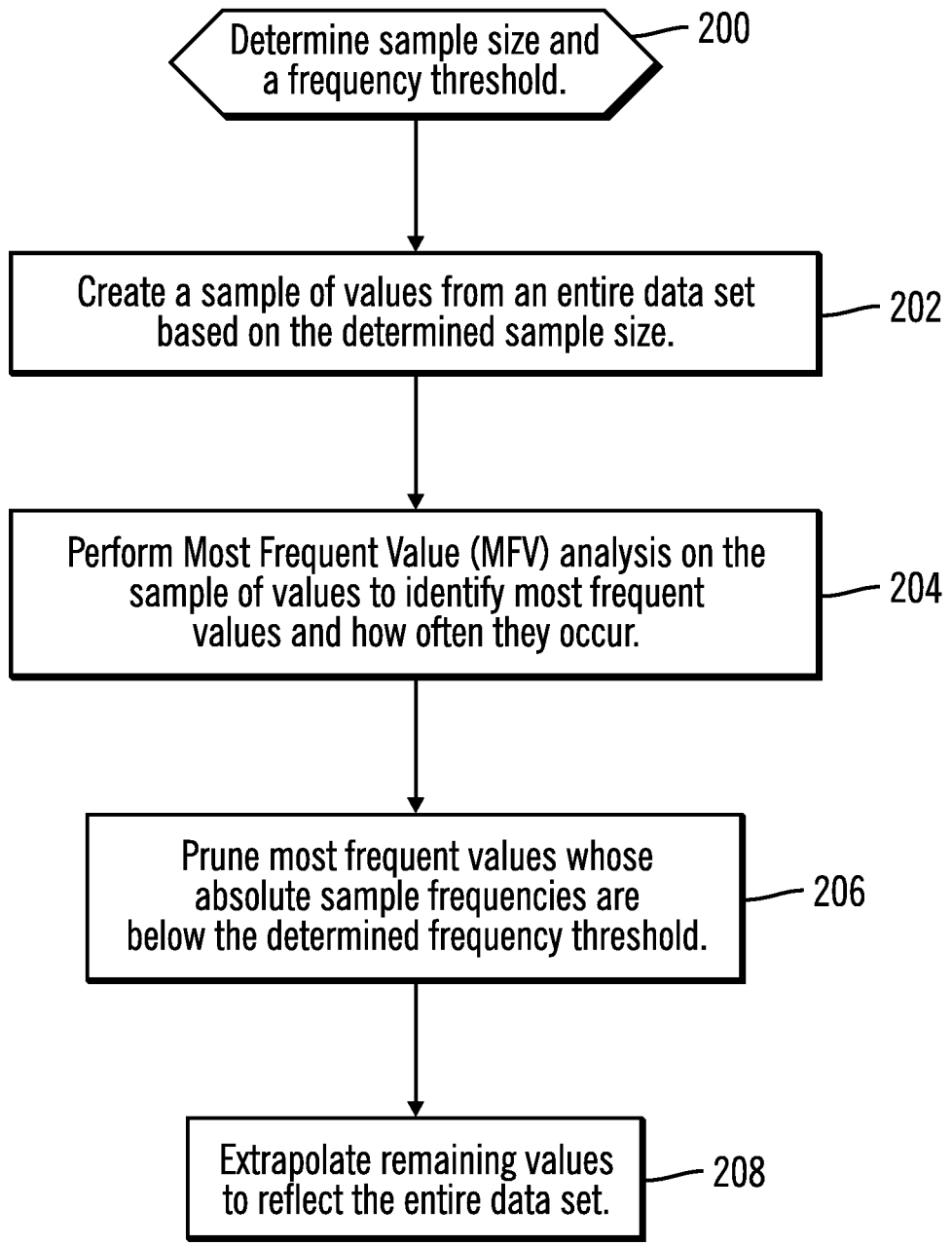
FIG. 2 illustrates, in a flow diagram, processing to determine most frequent values and how frequently they occur in accordance with certain embodiments.

FIG. 2 illustrates, in a flow diagram, processing to determine most frequent values and how frequently they occur in accordance with certain embodiments. In block 200, the MFV estimator 122 determines a sample size and a frequency threshold. In certain embodiments, determining the sample size includes determining a size of a sample for an entire data set and determining a size of a sample for each of the multiple nodes based on a number of rows stored in each of the multiple nodes and based on the determined size of the sample for the entire data set.

In block 202, the MFV estimator 122 creates a sample of values from an entire data set based on the determined sample size. In certain embodiments, a sample of values made up of rows is received from each of multiple nodes, and the samples of values from each of the multiple nodes are aggregated to generate a sample table storing the rows. This sample of values is used in MFV analysis.

In certain embodiments, a small sample of values that is random in nature and depicts the entire data set is used. This is helpful to avoid performing analysis on the entire data set, especially when the data set is a very large database with a large number of rows. In certain embodiments, the MFV estimator 122 creates a reservoir of a sample of values by using random sampling of data at each of multiple nodes in a parallel processing environment, where the data at the nodes forms the entire data set. Then, the reservoir from each of the multiple nodes is aggregated to generate a sample table that is used for MFV analysis. In certain embodiments, this sample is collected using a random sampling without replacement technique.

In block 204, the MFV estimator 122 performs the MFV analysis on the sample of values to identify most frequent values and how often they occur. In certain embodiments, the MFV analysis obtains a descending list of most frequent values and associated frequencies.

In block 206, the MFV estimator 122 prunes most frequent values whose absolute sample frequencies are below the determined frequency threshold. This is to remove values whose estimated frequency is less likely to be within given error bounds. The remaining top "n" rows are the rows with the values having the highest frequencies.

In block 208, the MFV estimator 122 extrapolates the remaining values to reflect the entire data set. In certain embodiments, the MFV estimator 122 extrapolates the identified most frequent values to the table row count, which is the total number of rows in the table. In certain embodiments, the MFV estimator 122 performs the extrapolation by multiplying the sample frequency by a ratio ("extrapolation factor"). In certain embodiments, the ratio is: n/sample_size, where sample_size is the size of the reservoir sample (e.g., 4,000, 8,000, 64,000, etc.). In certain embodiments, the counts are "null-aware" and do not take into account null values.

That is, in certain embodiments, a ratio of table cardinality to sample size is used for extrapolation. For example, if table cardinality is a million and sample size is 64000, the ratio is 15.625.

The MFV estimator 122 obtains accurate most frequent values by initially building a sample of values that represent an entire data set (e.g., a table). In certain embodiments, the MFV estimator 122 uses a reservoir sampling algorithm that uses a reservoir. In various embodiments, the reservoir may be anywhere from 4,000-64,000 in size, and the entire data set may be larger.

For example, as data in the entire data set is scanned, the reservoir sampling technique is used to determine whether the row has to be added to the reservoir. The row may be added to the reservoir or may replace an existing row in the reservoir. A row once sampled is not considered again. This kind of random sampling may be described as "random sampling without replacement".

In a Massively Parallel Processing (MPP) architecture, data is spread across multiple nodes 160a, 160b, 160c, . . . 160n. Each of the nodes 160a, 160b, 160c, . . . 160n gets part of the entire data set based on a distribution key. One node 160a, 160b, 160c, . . . 160n may get more data than another node 160a, 160b, 160c, . . . 160n.

When building the reservoir, denser nodes 160a, 160b, 160c, . . . 160n (e.g., nodes having more values) may be sampled more and may contribute more to the reservoir (than nodes having fewer values). Once each node 160a, 160b, 160c, . . . 160n builds its part of the reservoir, the reservoir data is sent from the node 160a, 160b, 160c, . . . 160n to the central node 120 and aggregated by the MFV estimator 122. Thus, at the end of the reservoir gathering process, the MFV estimator 122 at the central node 120 gets the consolidated sample to perform further analysis on.

In certain embodiments, the data accumulated by the reservoir may be thought of as a 4,000, 8,000 or a 64,000 reservoir table. In certain embodiments, to perform MFV analysis, the MFV estimator 122 selects each column from the reservoir table (consolidated reservoir) and runs a query on the selected column. The following is an example query (Query_1) that may be used for a column called REASON_CD, and this query provides a descending list of values and count of each of the values.

TABLE 1

| Query_1 |
|---|
| SELECT REASON_CD, COUNT(REASON_CD) FROM CALL_HISTORY GROUP BY REASON_CD ORDER BY 2 DESC LIMIT <n> |

In certain embodiments, a query similar to Query_1 is run on the accumulated reservoir table for each column to obtain values and counts in descending order. This list is pruned to the top "n" rows (which are the rows with the values having the highest frequencies).

In certain embodiments, such a query may be simulated using a plan generation mechanism, and MFV analysis generates a query execution plan on the fly and runs the query execution plan. At the end of the query execution plan run for each of the columns, values and their respective counts in the reservoir (e.g., in a new table with just values and counts) are obtained.

In certain embodiments, hashing techniques may be used to create unique keys from values. For example, hashing techniques may be used to identify most frequent values of a large character column. The column is subjected to hashing first, and then the hash value and a count of one is set. A subsequent same value occurring creates the same hash value. In that case, the count for the hash value is incremented by one. In certain embodiments, hashing is taken care of internally by the plan generation mechanism.

Next, the MFV estimator 122 selects valid MFVs from the results of the above query. By classical large sample theory, the probability, p, that the sample has not missed any very frequent values, and that the frequency estimates are within +/− epsilon, is given by G(n, epsilon/2), where G is Kolgomorov's distribution. Working backwards, if p is the desired accuracy, the value of n may be solve numerically or found using a table. In an implementation based on an 8000-row sample, for example, the MFV estimator 122 determined the frequency of very frequent values within a 5% error margin, 95% of the time. This determination is made irrespective of the size of the entire data set.

In certain embodiments, before the sample is selected, the sample size is computed and a numerical technique for computing a minimum absolute frequency for sample elements is determined. The minimum absolute frequency is used to determine which values are to be included in a pool of candidate frequent values. The minimum absolute frequency may also be referred to as a frequency threshold.

In certain embodiments, the MFV estimator 122 computes two series, (x, f(x)) and (x, g(x)) where xi is the absolute frequency of value i in the sample, f(xi) is its relative frequency in the sample, and g(xi) is its absolute frequency in the sample. For any data set, there exists a value i such that |f(xj)−g(xj)|<E whenever |j−i|<delta. In other words, there are values whose whole relative sample frequency is equal or almost equal to its relative frequency in the population. Let that frequency be x*. As the sample frequency deviates from x*, estimating the population frequency of such elements becomes less accurate. The farther the frequency gets on the low end, the sample has a tendency to under-estimate, and the higher the frequency gets on the high end, the sample has a tendency to over-estimate. By graphing f(x)−g(x) against x on top of f(x)/x, the point at which the two curves intersects is a sweet spot, and this is the technique used in certain embodiments to determine the minimum absolute frequency. In certain embodiments, values whose absolute sample frequencies are less than this frequency threshold are pruned from the frequent value candidates. Combining the graphic technique with Kolgomorov's distribution above, the MFV estimator 122 determines both the minimum sample size and the frequency threshold to find most frequent values within a given error bound. In certain embodiments, to determine the sample size, let p=the probability by which the sample distribution deviates from the population frequency is no greater than 0.05. So G(n, 0.025)=0.95. Then, embodiments work backwards to determine sample size, n.

As an example, for a sample of 8000 rows, the MFV estimator 122 found the frequency threshold to be 40. Values whose absolute sample frequencies are larger than 40 are added to a pool of candidate frequent values. Any value whose sample frequency is less than 40 are excluded from the pool of candidate frequent values.

In certain embodiments, the MFV estimator 122 uses linear extrapolation and extrapolates the individual reservoir counts to the (table cardinality−numNulls).

With embodiments, the MFV estimator 122 requires a fixed size sample independent of the total number of rows in the entire data set. Moreover, the MFV estimator 122 produces optimal results on parallel and distributed systems.

The MFV estimator 122 determines the most frequent values and how often they occur within a known error boundary for any type of workload.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 3:
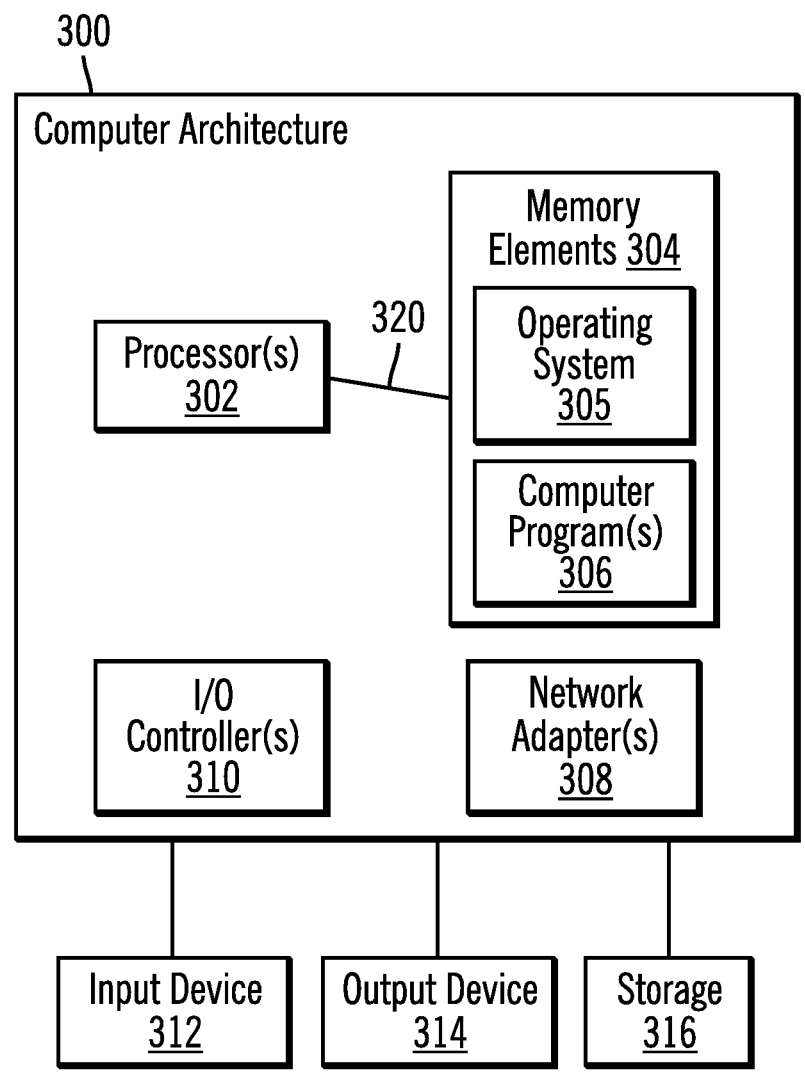
FIG. 3 illustrates, in a block diagram, a computer architecture that may be used in accordance with certain embodiments.

FIG. 3 illustrates a computer architecture 300 that may be used in accordance with certain embodiments. In certain embodiments, the client computer 110, central node 120, and/or each of the nodes 160a, 160b, 160c, . . . 160n may implement computer architecture 300. The computer architecture 300 is suitable for storing and/or executing program code and includes at least one processor 302 coupled directly or indirectly to memory elements 304 through a system bus 320. The memory elements 304 may include local memory employed during actual execution of the program code, bulk storage, and cache memories which provide temporary storage of at least some program code in order to reduce the number of times code must be retrieved from bulk storage during execution. The memory elements 304 include an operating system 305 and one or more computer programs 306.

Input/Output (I/O) devices 312, 314 (including but not limited to keyboards, displays, pointing devices, etc.) may be coupled to the system either directly or through intervening I/O controllers 310.

Network adapters 308 may also be coupled to the system to enable the data processing system to become coupled to other data processing systems or remote printers or storage devices through intervening private or public networks. Modems, cable modem and Ethernet cards are just a few of the currently available types of network adapters 308.

The computer architecture 300 may be coupled to storage 316 (e.g., any type of storage device; a non-volatile storage area, such as magnetic disk drives, optical disk drives, a tape drive, etc.). The storage 316 may comprise an internal storage device or an attached or network accessible storage. Computer programs 306 in storage 316 may be loaded into the memory elements 304 and executed by a processor 302 in a manner known in the art.

The computer architecture 300 may include fewer components than illustrated, additional components not illustrated herein, or some combination of the components illustrated and additional components. The computer architecture 300 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
receiving, using a processor of a computer, from each of multiple nodes, a sample of values made up of rows;
aggregating the sample of values from each of the multiple nodes to generate a sample table storing the rows;
using the sample table to obtain a descending list of most frequent values and associated frequencies;
pruning most frequent values from the descending list whose associated frequencies are below a minimum absolute frequency, wherein the minimum absolute frequency is determined by:
    computing two series, (x, f(x)) and (x, g(x)), where xi is an absolute frequency of element i in the sample table, f(xi) is a relative frequency in the sample table, and g(xi) is an absolute frequency in the sample table;
    graphing f(x)-g(x) against x on top of f(x)/x to plot two curves; and
    identifying a point at which the two curves intersect as the minimum absolute frequency; and
extrapolating remaining most frequent values to reflect a data set.

2. The method of claim 1, further comprising:
determining a size of a sample for the data set; and
determining a size of a sample for each of the multiple nodes based on a number of rows stored in each of the multiple nodes and based on the determined size of the sample for the data set.

3. The method of claim 1, further comprising:
generating the sample of values at each of the multiple nodes by using a random sampling with a reservoir technique in which, as a row is scanned, it is determined whether the row is to be added to a reservoir or used to replace an existing row in the reservoir, and wherein the row is sampled once.

4. The method of claim 1, wherein obtaining the descending list of most frequent values and associated frequencies further comprises:
for each column in the sample table, executing a query to obtain the descending list of most frequent values and associated frequencies.

5. The method of claim 1, wherein the multiple nodes are part of an Asymmetrical Massively Parallel Processing (AMPP) environment, and wherein each of the multiple nodes processes a portion of the data set based on a distribution key.

6. A computer program product, the computer program product comprising a computer readable storage medium having program code embodied therewith, the program code executable by at least one processor to perform:
receiving from each of multiple nodes, a sample of values made up of rows;
aggregating the sample of values from each of the multiple nodes to generate a sample table storing the rows;
using the sample table to obtain a descending list of most frequent values and associated frequencies;
pruning most frequent values from the descending list whose associated frequencies are below a minimum absolute frequency, wherein the minimum absolute frequency is determined by:

computing two series, (x, f(x)) and (x, g(x)), where xi is an absolute frequency of element i in the sample table, f(xi) is a relative frequency in the sample table, and g(xi) is an absolute frequency in the sample table;

graphing f(x)-g(x) against x on top of f(x)/x to plot two curves; and identifying a point at which the two curves intersect as the minimum absolute frequency; and extrapolating remaining most frequent values to reflect a data set.

7. The computer program product of claim 6, wherein the program code is executable by the at least one processor to perform:

determining a size of a sample for the data set; and determining a size of a sample for each of the multiple nodes based on a number of rows stored in each of the multiple nodes and based on the determined size of the sample for the data set.

8. The computer program product of claim 6, wherein the program code is executable by the at least one processor to perform:

generating the sample of values at each of the multiple nodes by using a random sampling with a reservoir technique in which, as a row is scanned, it is determined whether the row is to be added to a reservoir or used to replace an existing row in the reservoir, and wherein the row is sampled once.

9. The computer program product of claim 6, wherein obtaining the descending list of most frequent values and associated frequencies further comprises:

for each column in the sample table, executing a query to obtain the descending list of most frequent values and associated frequencies.

10. The computer program product of claim 6, wherein the multiple nodes are part of an Asymmetrical Massively Parallel Processing (AMPP) environment, and wherein each of the multiple nodes processes a portion of the data set based on a distribution key.

11. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform:

receiving from each of multiple nodes, a sample of values made up of rows;

aggregating the sample of values from each of the multiple nodes to generate a sample table storing the rows;

using the sample table to obtain a descending list of most frequent values and associated frequencies;

pruning most frequent values from the descending list whose associated frequencies are below a minimum absolute frequency, wherein the minimum absolute frequency is determined by:

computing two series, (x, f(x)) and (x, g(x)), where xi is an absolute frequency of element i in the sample table, f(xi) is a relative frequency in the sample table, and g(xi) is an absolute frequency in the sample table;

graphing f(x)-g(x) against x on top of f(x)/x to plot two curves; and identifying a point at which the two curves intersect as the minimum absolute frequency; and extrapolating remaining most frequent values to reflect a data set.

12. The computer system of claim 11, wherein the program instructions are stored on the at least one of the one or more storage devices for execution by the at least one of the one or more processors via the at least one of the one or more memories to perform:

determining a size of a sample for the data set; and determining a size of a sample for each of the multiple nodes based on a number of rows stored in each of the multiple nodes and based on the determined size of the sample for the data set.

13. The computer system of claim 11, wherein the program instructions are stored on the at least one of the one or more storage devices for execution by the at least one of the one or more processors via the at least one of the one or more memories to perform:

generating the sample of values at each of the multiple nodes by using a random sampling with a reservoir technique in which, as a row is scanned, it is determined whether the row is to be added to a reservoir or used to replace an existing row in the reservoir, and wherein the row is sampled once.

14. The computer system of claim 11, wherein obtaining the descending list of most frequent values and associated frequencies further comprises:

for each column in the sample table, executing a query to obtain the descending list of most frequent values and associated frequencies.

15. The computer system of claim 11, wherein the multiple nodes are part of an Asymmetrical Massively Parallel Processing (AMPP) environment, and wherein each of the multiple nodes processes a portion of the data set based on a distribution key.

\* \* \* \* \*